United States Patent [19]
Thies

[11] 4,200,923
[45] Apr. 29, 1980

[54] STEERED TIME COMPRESSOR BEAM FORMER

[75] Inventor: Fred W. Thies, Greensboro, N.C.

[73] Assignee: The United States of America as represented by the Secretary of the Navy, Washington, D.C.

[21] Appl. No.: 48,623

[22] Filed: May 28, 1970

[51] Int. Cl.² ............................................. G01S 3/80
[52] U.S. Cl. ................................. 367/123; 367/905; 343/100 SA
[58] Field of Search .......................... 340/6 R, 16 R; 343/100 CL, 100 SA; 367/123

[56] References Cited
U.S. PATENT DOCUMENTS

| | | | |
|---|---|---|---|
| 3,356,989 | 12/1967 | Autrey | 340/6 R |
| 3,371,197 | 2/1968 | Munson | 340/6 R |
| 3,521,044 | 7/1970 | Costas | 343/100 CL |
| 3,594,718 | 7/1971 | Black et al. | 343/100 CL |

Primary Examiner—Richard A. Farley
Attorney, Agent, or Firm—Richard S. Sciascia; Robert W. Adams

[57] ABSTRACT

A sonar apparatus incorporating steered time compressor means for time compressing and steering hydrophone information. Novel control circuitry enables time compressing and steering operations to be performed in a single storage device.

1 Claim, 7 Drawing Figures

STEERED TIME COMPRESSOR BEAM FORMER

BACKGROUND OF THE INVENTION

The invention is in the field of sonar. In sonar apparatus underwater transducers such as a hydrophone may receive sound energy from an underwater object such as a submarine. By arranging a plurality of hydrophones in a geometric array so that an accoustic wave from an underwater object strikes the individual hydrophones at discreet times in accordance with the geometry of the array, the azimuth of the underwater object can be determined. Most prior art sonar devices have been complex, expensive, and subject to mechanical failure. The present invention overcomes the problems of the prior art by providing a less complex, more rugged, and more efficient beam forming apparatus for a sonar device.

SUMMARY OF THE INVENTION

The invention comprises a sonar system including a combination of delay line circuits and control circuitry which make it possible to effect a "time compression" operation and a steering operation in a single storage means. Multiple storage devices, transfer mechanisms, and transfer operations of prior art sonar systems are avoided, thereby attaining a simplified, compact, more efficient, and less expensive sonar apparatus.

DESCRIPTION OF THE PREFERRED EMBODIMENT

Techniques have been developed for achieving a directional quality in sonar information signals for locating underwater objects. Such techniques include beam forming, steering, and shading. U.S. Pat. Nos. 2,991,562 and 3,163,844 show such sonar signal processing. Prior art sonar systems have also used "time compressing" storage devices useful in operating on information signals at an accelerated rate. U.S. Pat. Nos. 2,958,039 and 3,150,324 show time compressing storage devices, e.g. precessing delay line systems wherein a plurality of information bits are recirculated in one bit period. Prior art sonar systems utilizing time compression techniques have required multiple storage means in each information channel and multiple transfer operations between storage means for effecting the time compression and steering functions. Applicant's invention includes novel control apparatus and timing circuits for consolidating time compression and beam steering operations into a single storage device. The prior art requirement for multiple storage devices in each channel is avoided. The requirement of multiple transfers between storage devices is avoided. This results in savings of apparatus and time with a great increase in efficiency and a decrease in complexity and cost of the sonar apparatus.

Figure 1:
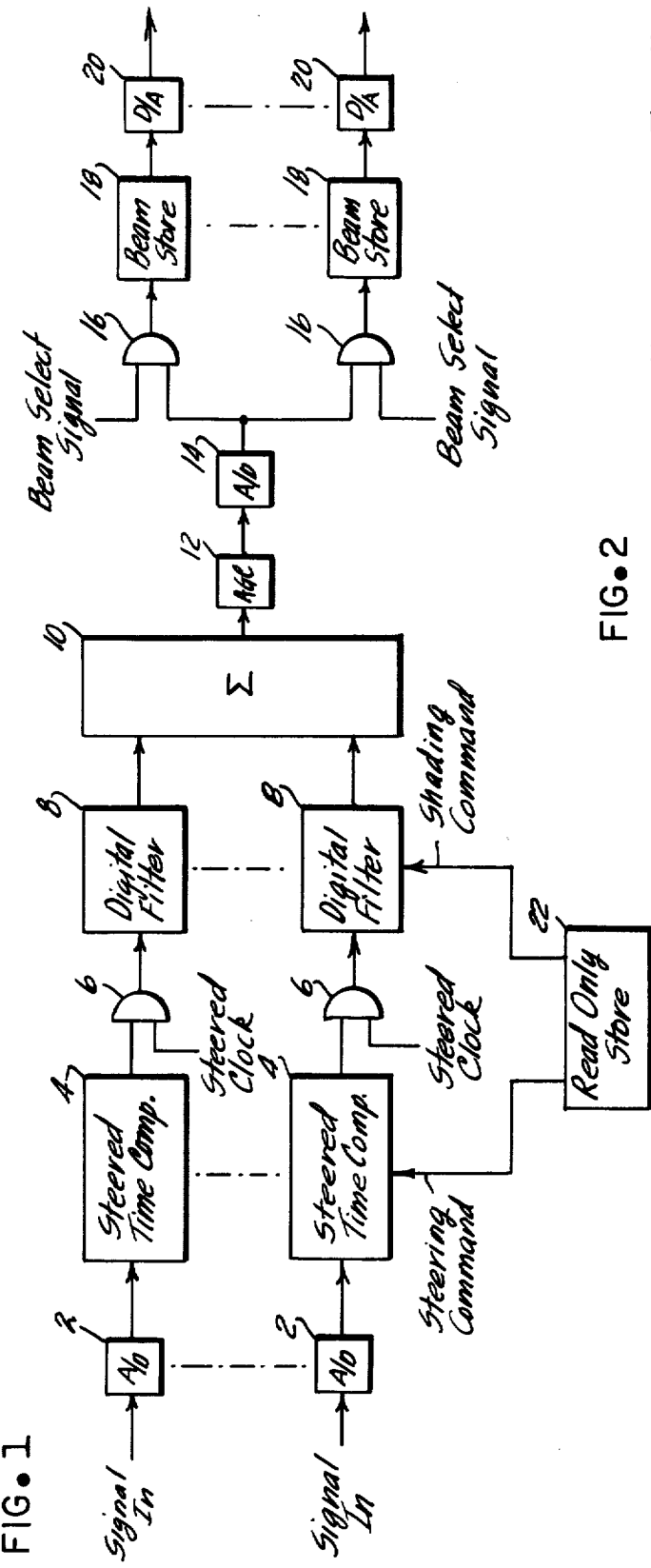
FIG. 1 shows the arrangement of the invention.

FIG. 1 shows the general arrangement of the invention in block form. A plurality of signals from respective transducers of an array are converted from a varying voltage to digital form in a respective plurality of analog to digital converters 2. The digital signals are processed in steered time compressor circuits 4 and gated through AND gates 6 by steered clock signals from circuitry which will be described presently. The output signals from gates 6 are forwarded through digital filters 8 to a summing circuit 10. The summer output voltage is applied to one input of AND gates 16 through analog to digital converter 14 and AGC circuit 12. The respective second inputs of AND gates 16 are supplied with beam select signals from circuitry to be described. The signal outputs of gates 16 are stored in beam store circuits 18 and converted in digital to analog converter circuits 20 to form the system output signals. A "read only" store 22 furnishes steering and shading command signals to steered time compressor circuits 4 and digital filter circuits 8.

The storage time $S_1$, required in applicant's steered time compressor circuits, is defined in the expression $S_1 \geq L + 1/f_T$ where L is the acoustic length in seconds of the array to be steered and $f_T$ is the rate at which blocks of information are transferred from summer 10 to beam store 18. If $f_T$ is made high enough, $S_1$ can be made approximately equal to L. This storage time is almost an order of magnitude less than that required by prior art systems. In a practical system described hereinafter $S_1 \approx 1.25L \approx 0.8$ sec.

The required steered time compressor storage time $S_1$ corresponds to the number of information bits in the steered time compressor loop which number is proportional to an input sampling rate $F_s$. The analog input signals are digitized by periodic sampling in a well known manner. The invention further reduces the total storage capacity requirement by using a short shift register to store the beam information prior to digital to analog conversion. For a practical design, beam storage capacity can be as low as 20% of that required by the steered time compressor.

Figure 2:
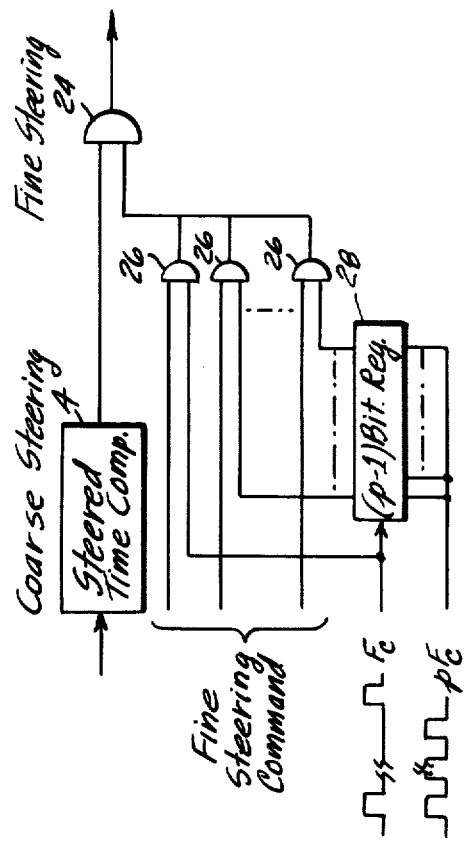
FIG. 2 illustrates the two step steering arrangement of the invention.

The invention does not require the high sampling rate necessary in prior art sonar to avoid steering granularity degradation. Circuitry is provided to accomplish steering in two steps. Coarse steering is performed in the steered time compressor, fine steering is performed at the compressor output. FIG. 2 illustrates the two step steering arrangement of the invention. After a coarse steering operation is accomplished in steered time compressor 4, the output signal is applied to one input terminal of an AND gate 24 which has a second input terminal connected to the outputs of a plurality of AND gates 26. One input terminal of each AND gate 26 is connected to receive fine steering commands. The second input terminal of a first AND gate 26 is connected to receive a system clock frequency $F_c$. A second input terminal of the remainder of AND gates 26 is connected to receive the respective output signals of the several stages of a $(p-1)$ bit shift register 28. Shift register 28 receives clock frequency $F_c$. A higher clock frequency $pF_c$ is fed to the several shift terminals of shift register 28. Thus the coarse steered output signal of steered time compressor 4 is fine steered by gating it through AND gate 24 in accordance with fine steering commands clocked through AND gates 26.

Figure 3:
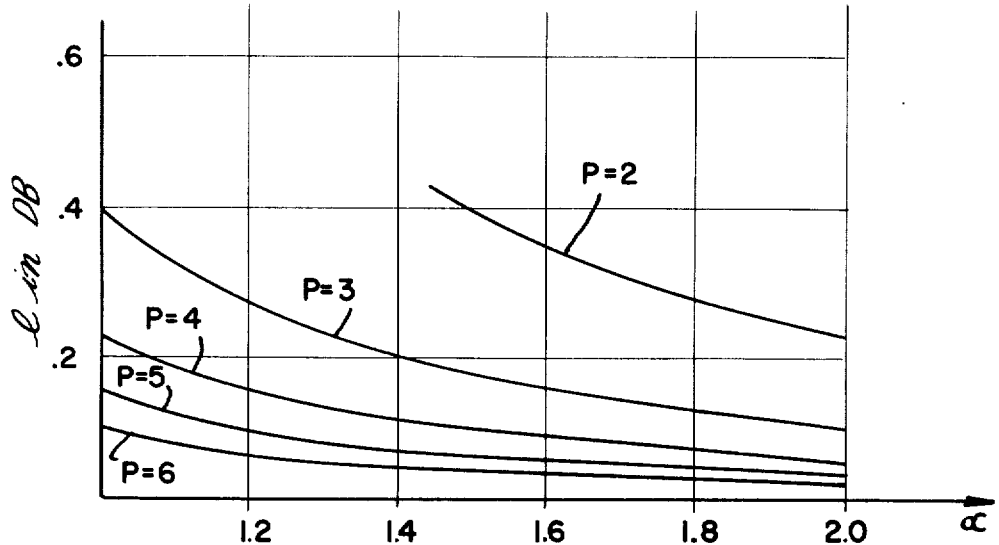
FIG. 3 is a graph illustrating relationships of certain design factors.

The quantity p in the $p-1$ expression defining the storage capacity of shift register 28 in FIG. 2 is related to two quantities λ and α, as shown graphically in FIG. 3. Here $\lambda = 3.56/(p^2\alpha^2) =$ steering granularity degradation in dB, and $\alpha = F_s/(2 \times$ Input Bandwidth$) =$ oversampling factor. As noted hereinbefore, $F_s$ is the sampling frequency.

Figure 4:
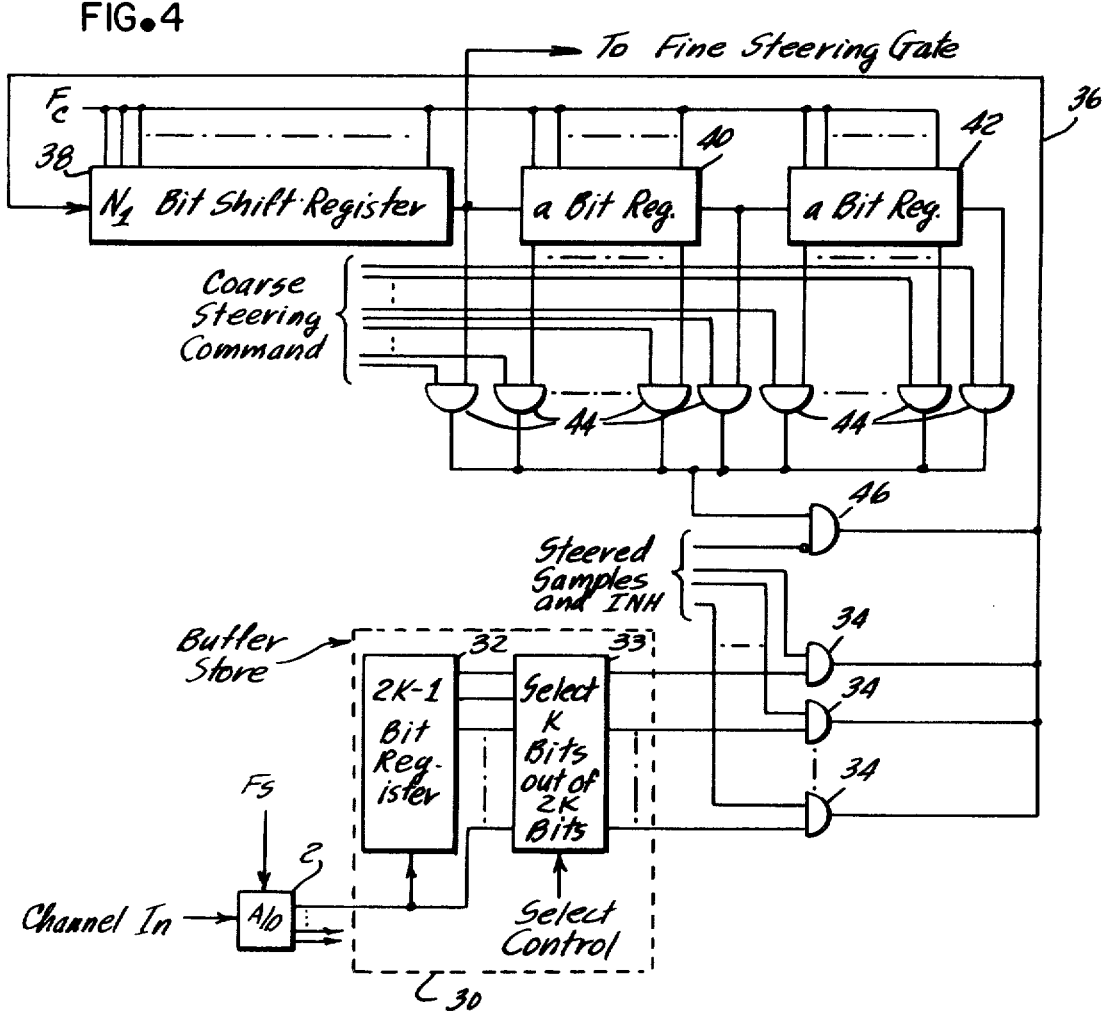
FIG. 4 shows a steered time compressor.

A generalized single bit steered time compressor is shown in FIG. 4. The generalized steered time compressor is similar to a generalized deltic, i.e., K bits of information are inserted in the loop every n recirculations of the stored information. Examples of "deltics" or "delay line time compressors" are shown in U.S. Pat. Nos. 2,958,039 and 3,150,324. In FIG. 4, the analog to digital converter 2 converts an analog signal from a transducer of a hydrophone array into digital signals at the sampling frequency $F_s$ and forwards digital output signals to a buffer store 30. Store 30 is comprised of a $2K - 1$ bit register 32 and a selecting circuit 33 which in response to select control signals synchronously forwards K bits selected out of $2K - 1$ bits to respective input terminals of a plurality of AND gates 34. Second input terminals of gates 34 receive steered sample signals on respective input lines so that the output signals from 33 are fed serially over a lead 36 to the input terminal of a shift register 38 which holds $N_1$ bits. $N_1 \geq (k/n)Q + LF_s$ where $Q =$ number of beams formed. The output of register 38 is connected to the input of a first steering register 40 which holds "a" bits. Here a $\geq \pi LF_s/Q$ for a linearly steered array and a $\geq 2LF_s/Q$ for a sinusoidally steered array. The output of 40 is connected to the input of a second steering register 42 which also holds "a" bits. The several stages of registers 40 and 42 are connected to respective control inputs of a plurality of coarse steering gates 44 which receive the coarse steering command signals at respective second inputs. The outputs of gates 44 are commoned and fed through a gate 46 back to the input of register 38 when 46 is not inactivated by an inhibit signal on its second input terminal. The output of register 38 is the coarse steered signal which is fed to fine steering gate 24 (FIG. 2).

Figure 5:
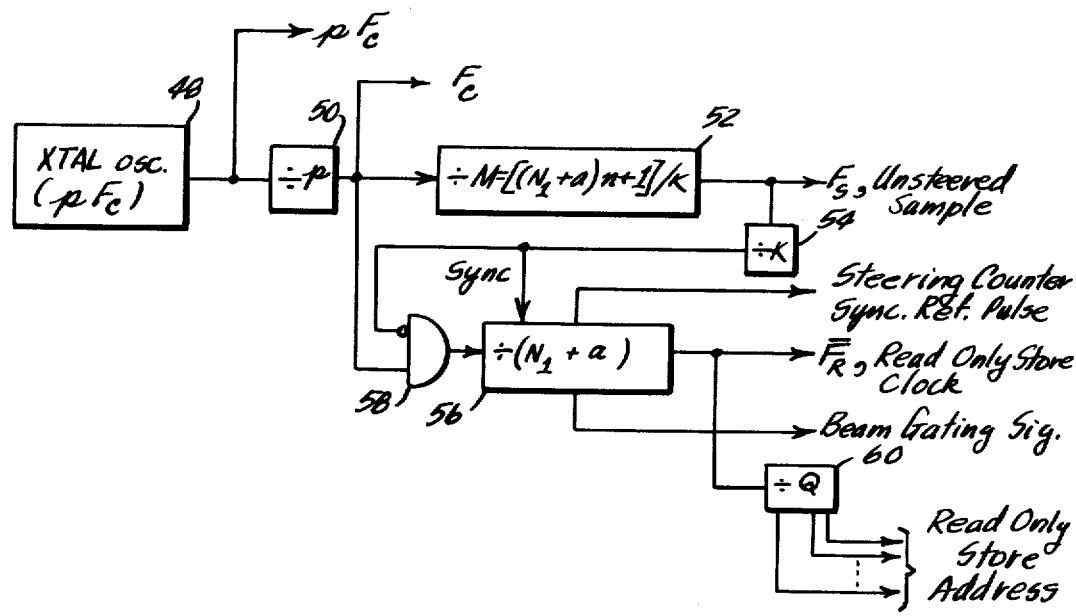
FIG. 5 shows a control unit of the invention.

A control unit for generating the various timing signals required by the system is shown in FIG. 5. A master crystal controlled oscillator 48 generates an output frequency $pF_c$ which is divided at a divider 50 to produce the steered time compressor clock frequency $F_c$. $F_c$ is divided in a divider 52 by a factor $$M = \frac{(N_1 + a)n + 1}{k}$$

to produce the unsteered sample frequency $F_s$ which controls the input analog to digital converters 2 (FIG. 1). $F_s$ is divided by k at a divider 54 to produce a sync signal for a divider 56 which divides the output of a gate 58 by the factor $(N_1 + a)$ to produce a signal $\bar{F}_R$, the read only store clock. Gate 58 gates $F_c$ when not inhibited by the sync signal $F_s/k$. The signal frequency $\bar{F}_R$ is divided by Q at a divider 60 to produce read only store address signals. The quantity M must be an integer since a digital divider is used. Here $$M = \frac{(N_1 + a)n + 1}{k} = \frac{F_c}{F_s} \geq Q + \frac{nLF_s + 1}{k}.$$

The multiplication ratio must always be greater than the number of beams formed. The average frequency of the read only store clock $\bar{F}_R = F_c /(N_1 + a + 1/n)$.

Figure 6:
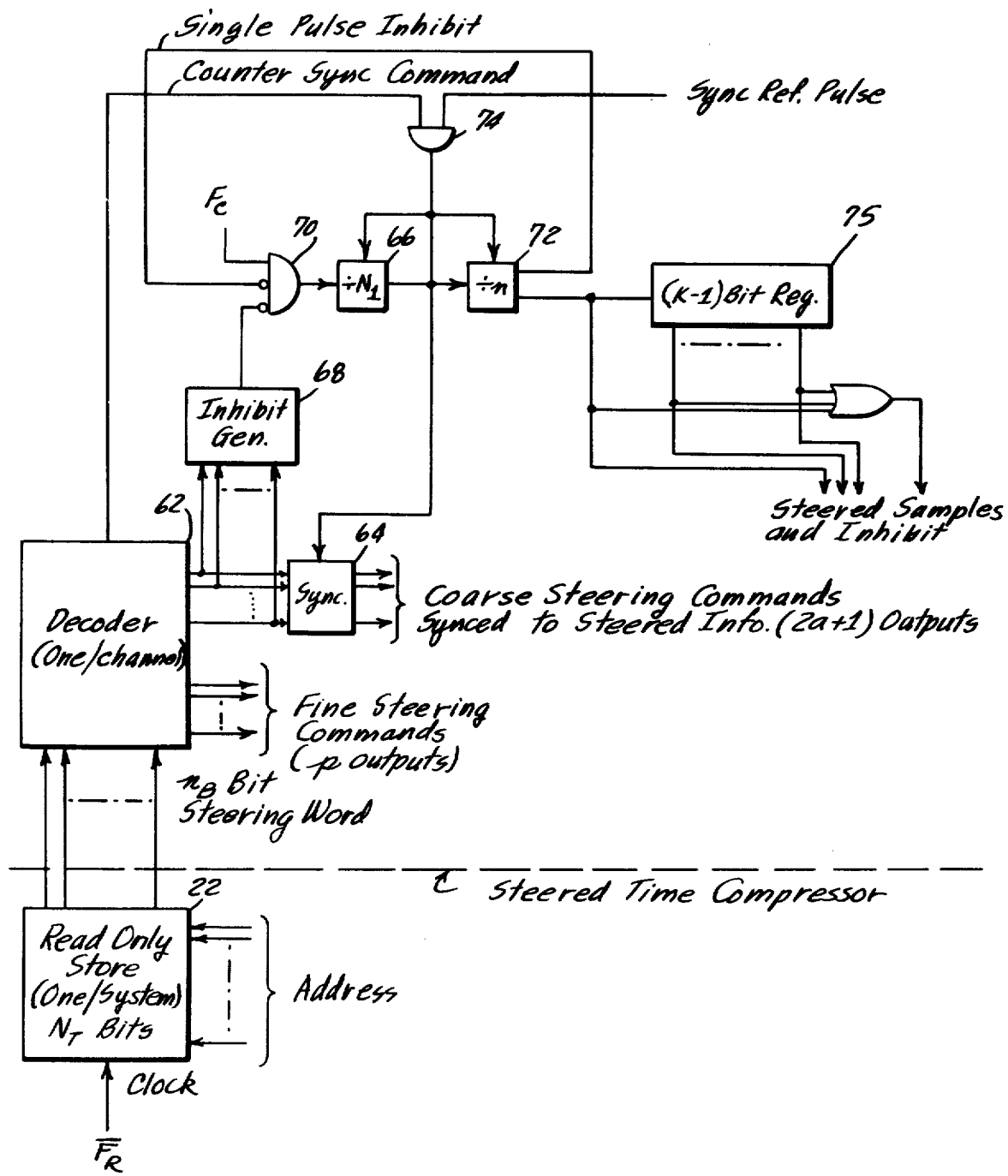
FIG. 6 shows a steering control unit.

A steering control unit for a steered time compressor is shown in FIG. 6. An address input is clocked by the read only store clock frequency $\bar{F}_R$. The output of 22 is decoded in a decoder 62. The output of 62 consists of p fine steering command outputs and $2a + 1$ coarse steering command outputs which are synchronized in a sync circuit 64 by a sync signal from a steering counter 66 and forwarded to respective gates 44 (FIG. 4). The coarse steering command output signals from 62 are also furnished to an inhibit signal generator 68 which provides one inhibiting input to a gate 70. A second inhibit input to 70 is furnished by an output from a divide by n divider 72 which receives its input signals from the output of divide by $N_1$ counter 66. Gate 70 forwards the clock signal $F_c$ to divider 66 in the absence of inhibit signals. A gate 74 actuated by sync reference pulses and a signal from decoder 62 furnishes synchronizing signals to both dividers 66 and 72. The output signals from 72 provide the input to a $(K - 1)$ bit register 75 which provides steered samples and inhibit signals on a plurality of output leads (for gates 34, 46 of FIG. 4). The number of bits $N_T$ required by the read only store is given by $$N_T = n_B HQ$$

where $n_B =$ number of bits in steering word
H = number of hydrophone channels
$Q =$ number of beams formed.

Sync circuit 64 essentially steers the coarse steering commands so that they "follow" the steered time compressor records.

The effective division ratio of counters 66, 72 is varied by the inhibit signals to gate 70 from inhibit generator 68. The inhibit signal to gate 70 from 72 is provided by a word recognizer circuit in 72 which produces an inhibit pulse just prior to the time a steered sample pulse appears. This produces an effective division ratio of $(N_1 + a) n + 1$, which is the same as k times the system multiplication ratio.

Figure 7:
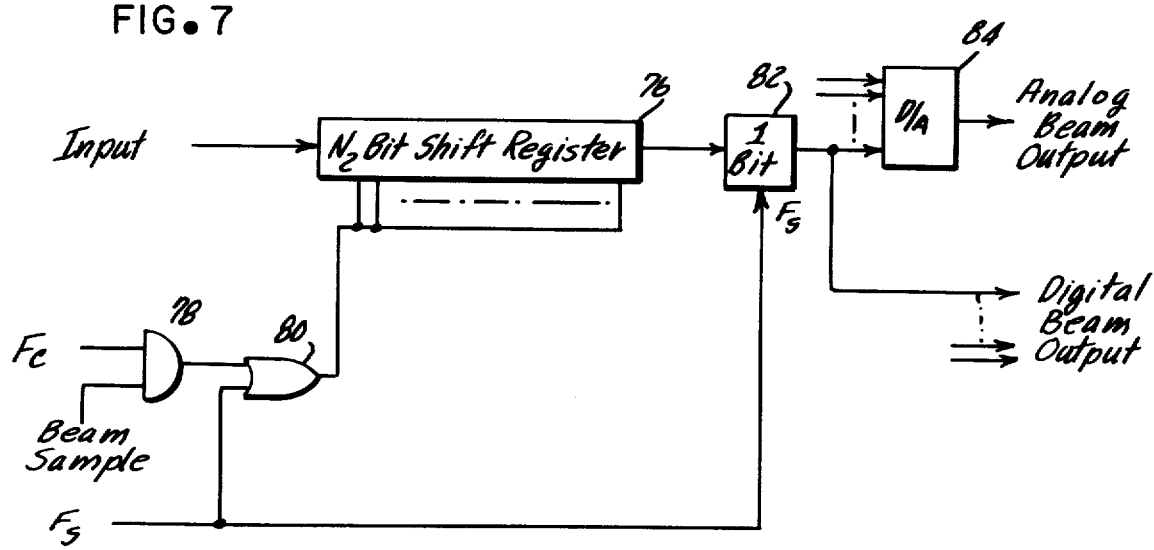
FIG. 7 shows a beam store of the invention.

A beam store (18 in FIG. 1) is shown in FIG. 7. The beam store is comprised essentially of an $N_2$ bit shift register 76 into which the beam information is read at a high rate between sample intervals. This is accomplished by applying the clock frequency $F_c$ to the shift inputs of 76 through a gate 78 which is activated by a beam sample signal. After the information is read in, the shifting rate of register 76 is lowered to the sampling rate which makes it possible to read out the information slowly in either analog or digital form. This is accomplished by applying the sampling frequency $F_s$ through or gate 80 to the shift terminals of register 76 and a one bit register 82 which is connected to the output of register 76. The output of 82 is the digital beam output information which may be converted to analog form in a converter 84. The number of bits $N_2$ required for the beam store is given by the following inequality: $N_2 \geq k/n \, Q$.

The following table shows the parameters of a practicable embodiment of the invention using 10 MHz semiconductor shift register memory units having a storage capacity of 100 bits:

| | | |
|---|---|---|
| L = .655 sec. | | |
| Q = 1280 beams | | |
| $\alpha$ = 1.247 | | |
| $F_c$ = 10 MHz | | |
| $pF_c$ = 50 MHz | | |
| $F_s$ = 1.247 KHz | | |
| $\overline{F}_R$ = 9.98 KHz | | |
| M = 8017 | | |
| k = 1 | | |
| n = 8 | | |
| a = 2 | | |
| p = 5 | | |
| l = .09 dB | | |
| $f_T$ = 7.8 Hz | | |
| $n_B$ = 6 bits | | |
| H = 40 | | |
| $N_T$ = 307,200 bits | | |
| $N_1$ = 1000, | $S_1$ = .8017 sec., | $D_1$ = 100 μsec. |
| $N_2$ = 200, | $S_2$ = .16034 sec., | $D_2$ = 20 μsec. |
| $N_3$ = 160, | $S_3$ = .128272 sec., | $D_3$ = 16 μsec. |

What is claimed is:

1. In a sonar apparatus, the improvement comprising:
a geometrical array comprising a plurality of hydrophones,
a plurality of analog-to-digital converters, each converter connected to receive analog signals from a respective hydrophone,
a plurality of steered time compressors, each time compressor connected to receive a digital signal from a respective converter,
a plurality of first AND gates, each of said first AND gates being connected to receive a digital output signal from a respective compressor and a steered clock signal,
a plurality of digital filters, each filter being connected to receive an output signal from a respective one of said first AND gates,
a read only store connected to furnish steering commands to each of said steered time compressors and shading commands to each of said digital filters,
a summing circuit connected to receive an output signal from each of said digital filters and to furnish a summed output signal to each of a plurality of second AND gates through a serially connected AGC circuit and an analog-to-digital converter,
each of said second AND gates being connected to receive a beam select signal,
a plurality of beam stores each connected to receive an output signal from a respective second AND gate,
a plurality of digital-to-analog converters each connected to receive an output signal from a respective beam store,
means to form said steered clock signal comprising a plurality of third AND gates and a bit register,
each of said third AND gates being connected to receive an output signal from a respective output of said bit register and a respective fine steering command lead,
said bit register being connected to receive a clock frequency on an input terminal and a multiple of said clock frequency on a plurality of shift terminals,
said steered time compressor comprising,
a shift register made from three serially connected smaller registers each connected to receive a clock frequency on a plurality of shift terminals,
a plurality of fourth AND gates each connected to receive an output from said shift register and a coarse steering command,
a commoned output of said fourth AND gates being connected to the input of said shift register through a fifth AND gate, and
a plurality of sixth AND gates each connected to furnish an output to the input of said shift register and to receive a respective steered sample signal and an output from said analog-to-digital converter through a buffer store.

* * * * *